No. 689,732. Patented Dec. 24, 1901.
C. LAVAL
APPARATUS FOR SILVERING GLASS.
(Application filed Mar. 21, 1901.)
(No Model.) 4 Sheets—Sheet 1.
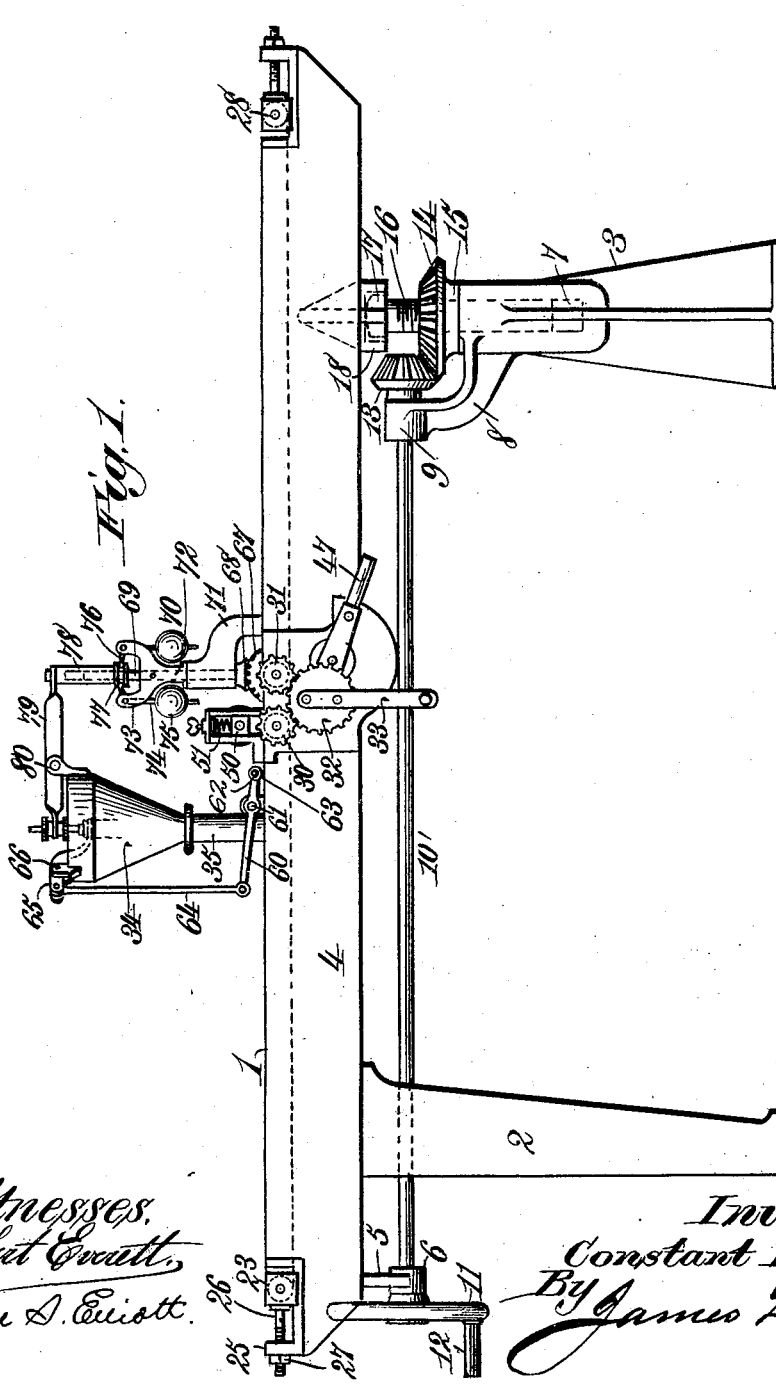

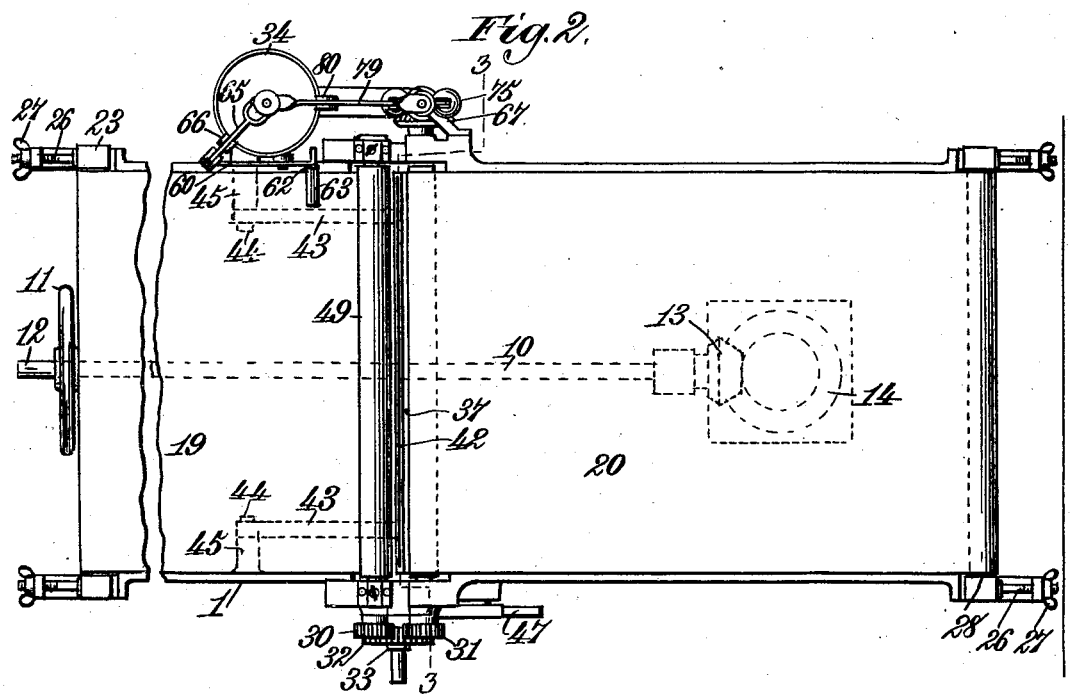

No. 689,732. Patented Dec. 24, 1901.
C. LAVAL.
APPARATUS FOR SILVERING GLASS.
(Application filed Mar. 21, 1901.)
(No Model.) 4 Sheets—Sheet 3.
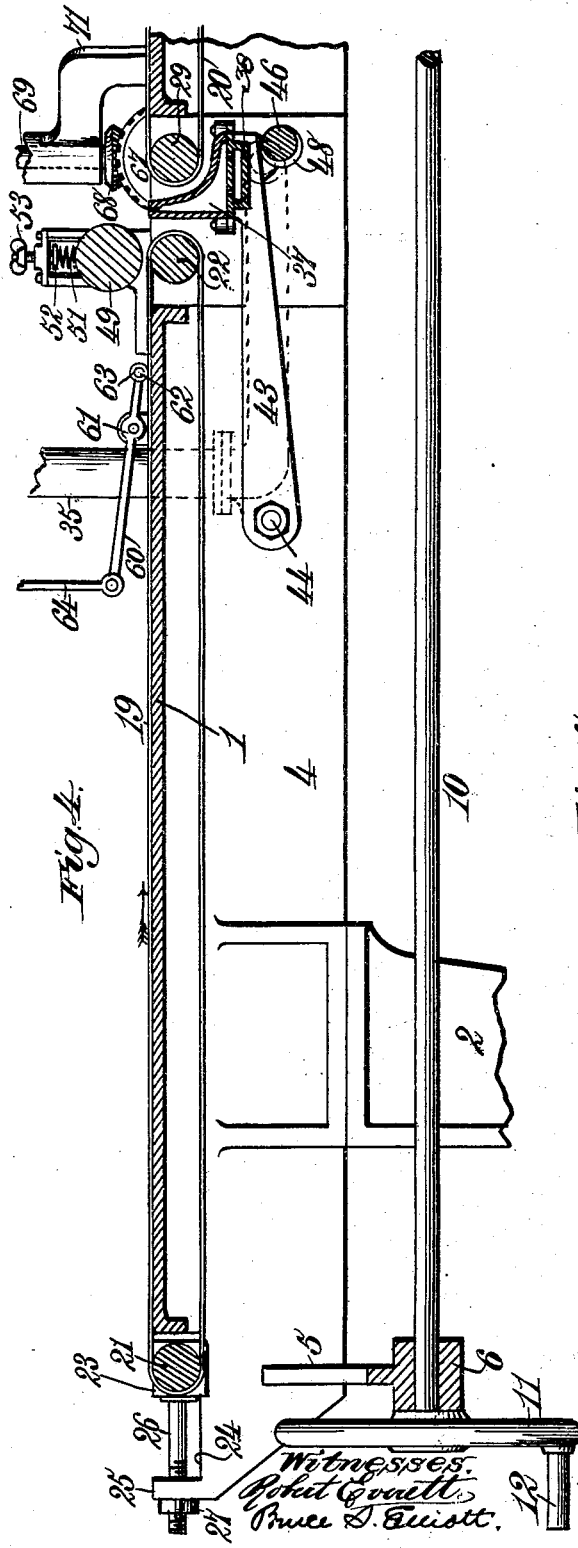
Inventor
Constant Laval
By James L. Norris
Atty.
Witnesses
Robert Everett
Bruce T. Elliott No. 689,732. Patented Dec. 24, 1901.
C. LAVAL.
APPARATUS FOR SILVERING GLASS.
(Application filed Mar. 21, 1901.)
(No Model.) 4 Sheets—Sheet 4.
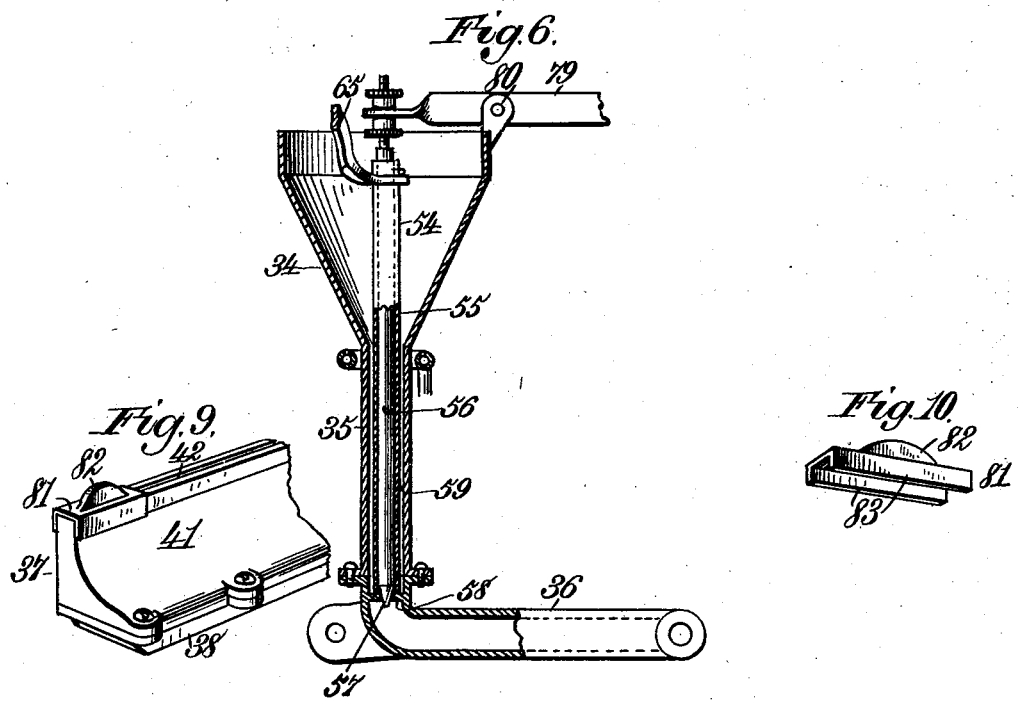
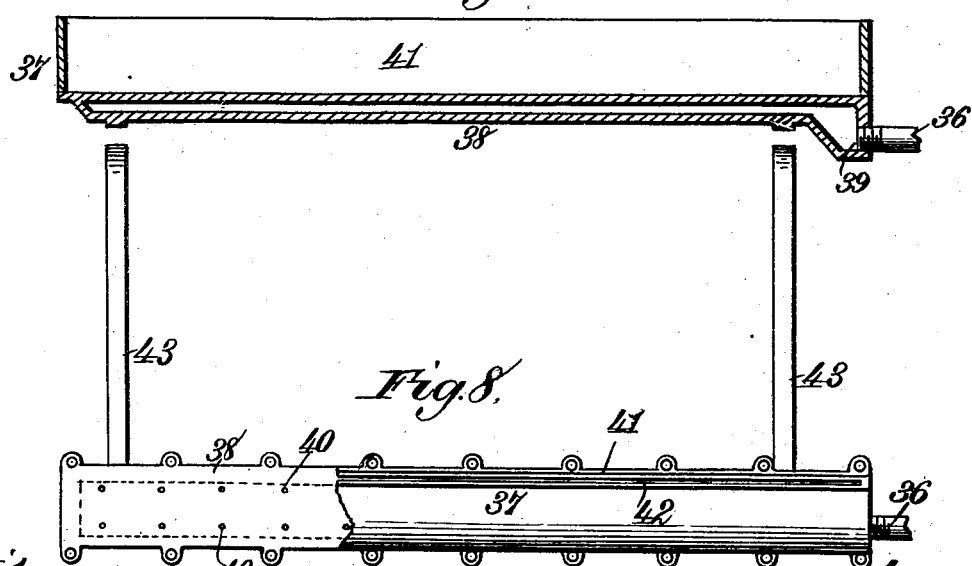
Witnesses,
Robert Everitt,
Bruce A. Elliott
Inventor:
Constant Laval,
By James L. Norris.
Att'y.

UNITED STATES PATENT OFFICE.

CONSTANT LAVAL, OF ALLEGHENY, PENNSYLVANIA.

APPARATUS FOR SILVERING GLASS.

SPECIFICATION forming part of Letters Patent No. 689,732, dated December 24, 1901.

Application filed March 21, 1901. Serial No. 52,222. (No model.)

*To all whom it may concern:*

Be it known that I, CONSTANT LAVAL, a citizen of the United States, residing at Allegheny, in the county of Allegheny and State of Pennsylvania, have invented new and useful Improvements in Apparatus for Silvering Glass, of which the following is a specification.

My invention relates to apparatus for silvering glass for the production of mirrors. The same relates particularly to that class of glass-silvering apparatus in which an amalgam in a fluid or molten condition is delivered from a hopper or crucible to a distributer, in contact with which the glass is caused to pass and by means of which the amalgam is applied to the surface of the glass.

The object of the invention is to provide novel means for feeding the glass through the apparatus, which will prevent the scratching or abrading of the soft amalgam after it has been applied to the surface of the glass.

A further object of the invention is to provide means whereby the flow of amalgam from the hopper or crucible to the distributer is automatically started when the moving glass reaches a point adjacent to the distributer and is automatically stopped or cut off when the glass passes beyond the distributer.

A further object of the invention is to provide means whereby the flow of amalgam may be automatically controlled according to the speed of movement of the glass through the apparatus.

A further object of the invention is to provide means whereby the distributer may be raised and lowered for the purpose of adjusting its position with respect to the surface of the moving glass which moves in contact therewith.

Other objects and advantages of the invention will hereinafter appear and the novel features thereof will be set forth in the claims.

In the drawings forming part of this specification, Figure 1 is a side elevation illustrative of my improved apparatus. Fig. 2 is a plan view of the same. Fig. 3 is a cross-section on the line 3 3 of Fig. 2. Fig. 4 is a longitudinal section. Fig. 5 is a sectional end elevation of the table. Fig. 6 is a detail sectional view of the hopper. Fig. 7 is a cross-section of the distributer. Fig. 8 is a plan view of the same, partly broken away. Fig. 9 is a perspective view of one end of the distributer, and Fig. 10 is a detail perspective view of one of the slides for controlling the length of the discharge-opening in the distributer.

In carrying out my invention I employ a table 1, supported at one end upon the legs 2 and at the other end upon the legs 3. The said table is rigidly secured to the legs 2, whereas it is adjustably mounted upon the legs 3, so that it may be raised or lowered for the purpose of tilting the same in one direction or the other. Said table is formed with parallel side flanges 4, which are connected at the forward end of the machine by means of a cross-bar 5, which is extended downwardly at its center and formed with a bearing-boss 6. The legs 3 are connected together by a cross-bar 7, to the central portion of which is formed an upwardly and forwardly extending arm or bracket 8, provided with a bearing-boss 9 in line with the boss 6, heretofore referred to. Extending through the bosses 6 and 9 is a longitudinal shaft 10, having a wheel 11, provided with an operating-handle 12 upon one end thereof and a pinion 13 upon the opposite end. The said pinion 13 meshes with a corresponding gear 14, formed upon an internally-threaded sleeve 15, in which fits the threaded end of a vertically-movable bar 16. The upper end of the bar 16 is provided with a head 17, which fits within a socket 18 on the under side of the table 1. By this construction it will be observed that by turning the shaft 10 in one direction or the other the sleeve 15 will also be turned by the engagement of the pinion 13 with the gear 14, and the rod 16 will be raised or lowered by reason of the fact that the threaded end thereof engages the internal threads on the sleeve 15. The raising or lowering of the rod 16 causes a corresponding movement of one end of the table 1 and effects the tilting thereof for a purpose which will hereinafter appear.

Moving upon the upper surface of the table 1 are two belts or carriers 19 20. The belt 19 extends from the feed end of the machine to a point adjacent to the center thereof, and the belt 20 extends from a point adjacent to the inner end of the belt 19 to the discharge end of the machine. The belt 19 passes around the rollers 21 22, the said rollers extending transversely of the machine and arranged, of course, parallel to each other. The roller 21 is an idle roller and is mounted in adjustable bearings 23 in the side flanges 4 of the table 1. To receive the bearings 23, the flanges 4 are cut away or recessed, as shown at 24, and through the flanges 25, formed by the recesses 24, extend the threaded bolts 26. The said bolts are secured to the bearings 23 and are provided with wing-nuts 27 upon their outer ends, by means of which said bolts may be drawn outwardly, carrying with them the bearings 23, and thereby tightening the belt 19. The belt 20 passes around the rollers 28 29, the roller 28 being mounted in adjustable bearings and adapted to be moved for the purpose of tightening the belt by means similar to that described with reference to the roller 21. The journals of the rollers 22 and 29 are extended through one of the side flanges 4 of the table 1 and are provided with gears or pinions 30 31, respectively. Intermeshing with the pinions 30 and 31 is a driving-gear 32, having an operating crank or handle 33 thereon, by means of which it may be turned. As the driving-gear 32 is rotated in one direction or the other a movement of the pinions 30 and 31 and of the rollers 22 and 29, to which said pinions are secured, will be effected in the same direction with each other, but in a direction opposite that in which the gear 32 is turned. The belts or carriers 19 and 20 therefore will be driven in the same direction from the same source of power.

Secured to the table 1 and projecting from the side thereof opposite the operating crank or handle 33 for the belts or carriers 19 and 20 is a hopper or crucible 34 for the liquid or molten amalgam with which the glass is to be coated. The said hopper is preferably funnel shape in form and has a contracted cylindrical lower end 35, which communicates through a horizontally-disposed delivery-pipe 36 with the distributer 37. The said distributer 37 extends transversely of the machine, and the upper contracted delivery end thereof is located between the rollers 22 and 29 and in substantially the same plane with the upper surface of the belts or carriers 19 and 20. Said distributer is preferably made in two parts, the base 38 thereof being hollow and having an opening 39 at one end, with which the delivery-pipe 36 communicates, and provided with a plurality of small openings or perforations 40 in its top. To the upper edge of the base 38 is bolted or otherwise secured, so as to form a close joint, the top or delivery end 41, the same having one vertical side and a curved side, which gradually converges from the base 38 up to the extreme upper end of said top. A tapering or contracted chamber is thereby formed by the top 41 in the upper end of the distributer. At the apex of the top 41 of the distributer 37 is formed an elongated narrow slit 42, through which the liquid or molten amalgam is discharged and applied to the surface of the glass being silvered, it being of course understood that the glass is introduced into the machine upon the belt or carrier 19 and conveyed thereby over the slit or opening 42, where it receives its coating of amalgam, and is then delivered upon the belt or carrier 20, by which it is conveyed to the discharge end of the machine.

It is important, of course, that the upper end of the distributer 37, in which the slit 42 is formed, be maintained in constant contact with the surface of the glass while the same is being passed through the machine. To provide for this and to furnish means whereby the position of the distributer 37 may be adjusted with respect to the surface of the moving glass, I form upon or secure to the under side of the base 38 the longitudinally-extending arms 43, which are pivoted at their free ends upon the inwardly-extending studs 44, said studs projecting through lugs or bosses 45 on the side flanges 4 of the table 1. This pivotal connection of the arms 43 with the table 1 provides for the vertical movement of the distributer 37 on the studs 44. To support the distributer and to adjust the same, I extend across the machine, directly beneath the base 38 thereof, a cam-shaft 46, having an operating handle or lever 47 on the projecting end thereof, by means of which it may be turned. The cams 48 on the shaft 46 bear against the under side of the distributer and sustain the weight thereof. When the shaft 46, however, is turned and changes the points of engagement of the cams 48 with said distributer, the latter is raised or lowered in an obvious manner for the purpose of moving the discharge end of the distributer to a point nearer to or farther removed from the surface of the glass.

To maintain the glass in yielding contact with the discharge end of the distributer while the same is passing thereover, I provide adjacent to said distributer a laterally-extending pressure-roller 49, whose bearings 50 are adjustably mounted on opposite sides of the machine and are acted upon by the springs 51. The tension of said springs may be varied for the purpose of regulating the pressure exerted by the roller 49 by means of the plates 52, which engage the upper ends of the springs 51, and screws 53, bearing upon said plates.

The flow of amalgam from the hopper 34 into the distributer 37 is controlled by means of a vertically-movable duplex valve 54, made in two parts, consisting of a tube 55 and a central needle 56, the said needle 56 having a tapering lower end 57. The seat 58 for both parts of the valve 54 is formed by an annular inwardly-extending flange at the entrance to the distributing-pipe 36. The said flange 58 is formed with a central tapering aperture to receive the lower end of the part 56 of said valve, whereas the tube 55 of said valve rests upon and is supported by said flange. The tube 55 is located within the cylindrical lower end 35 of the hopper 34, but is of slightly smaller diameter than the same, thereby providing an annular passage 59, leading from the body of the hopper 34 to the distributing-pipe 36. The tube 55 of the valve 34 serves as a cut-off for preventing the flow of amalgam from the hopper 35 to the pipe 36, whereas the part 56 of the valve 34 serves as a means for controlling the extent of flow of material from the hopper 34 to the pipe 36 when the cut-off 55 is raised or opened. The cut-off 55, forming a part of the duplex valve 54, is adapted to be raised and lowered automatically for the purpose of opening and closing communication between the hopper 34 and the distributing-pipe 36 by means of a lever 60, fulcrumed at 61 on the side flange 4 of the table 1 which is adjacent to the hopper 34, and provided with an inwardly-extending arm 62, having a roller 63 thereon. The arm 62 and the roller 63 project from above the belt or carrier 19 and are adapted to be engaged by the glass plate when the same is passed through the machine. The end of the lever 60 opposite the arm 62 thereof is connected through a link or pitman 64 with the outer end of a lever 65, fulcrumed upon a bracket 66 in the upper end of the hopper 34. The opposite end of the lever 65 is connected with the tube or cut-off 55, so that when the inner end of the lever 65 is raised it will lift with it the cut-off 55 and open communication between the hopper 34 and the delivery-pipe 36, it being of course understood that the part 56 of the valve 54 is raised during the passage of the glass through the machine. When, therefore, the plate of glass on the carrier 19 strikes against the roller 63 on the arm 62, said arm 62 is raised and the lever 60 is rocked on the fulcrum 61. This causes a depression of the outer end of the lever 60, a consequent depression of the outer end of the lever 65, and an elevation of the inner end of said lever and the cut-off 55 connected therewith. As soon as the plate of glass strikes the roller 63, therefore, the cut-off 55 is raised and the amalgam from the hopper 34 is permitted to flow therefrom through the pipe 36 into the distributer 37. As soon as the rear end of the plate of glass passes beyond the roller 63 the cut-off 55 seats by gravity and automatically checks the flow of amalgam from the hopper 34. It will thus be seen that the opening and closing of the cut-off 55 are controlled automatically by the glass in its movement through the machine.

For regulating the quantity of amalgam which flows from the hopper 34 to the distributer 37 according to the speed of movement of the plate of glass through the machine, I provide means controlled by the feeding devices for the plate of glass for raising the needle or plunger 56, which constitutes a portion of the duplex valve 54, to a greater or less degree. This means will now be described.

On the journal of the roller 29 at the end thereof opposite the pinion 31 is secured a bevel-pinion 67, which meshes with a corresponding pinion 68 on the lower end of a vertical shaft 69, constituting the main shaft of a governor, (represented as a whole by the numeral 70.) The shaft 69 is mounted in suitable bearings in a bracket 71, secured to one side of the table 1, and has keyed or otherwise secured to it a sleeve 72, having outwardly-extending bracket-arms 73 thereon. In these arms 73 are pivoted the governor-arms 74, having the weights 75 on their lower ends. The upper ends of said arms are provided with inwardly-extending fingers 76, which fit within an annular groove 77 on a sleeve 78, loosely mounted on the shaft 69. The upper end of said sleeve is connected with a lever 79, fulcrumed at 80 on the upper end of the hopper 34 and adjustably connected at its inner end to the needle or plunger 56. Now as the belts or carriers 19 and 20 are driven from the same source of power and move with the same speed, if the speed of movement of said belts or carriers increases the speed of rotation of the driving-rollers 29 and 22 must necessarily be increased. As the shaft 69 of the governor 70 is geared directly with the roller 29 of the pulley 20, if the speed of rotation of the roller 29 increases a corresponding increase of rotation will be imparted to the shaft 69. The normal position of the arms 74 and of the weights 75 thereon is as shown in the drawings. When the speed of rotation of the shaft 69, to which said arms are connected, increases, therefore, the balls 75, with the arms 74, to which they are connected, will be thrown outwardly by centrifugal force. This action will, through the engagement of the fingers 76 with the sleeve 78, draw down said sleeve, and consequently depress the outer end of the lever 79. When this takes place, the opposite end of the lever 79 will be lifted and the valve plunger or needle 56 raised and opened. The extent to which the needle 56 is raised and opened will correspond with the speed at which the shaft 69 is rotated. If the plate of glass be passed through the machine rapidly, therefore, the flow of material from the hopper 34 to the distributer 37 will be correspondingly increased, so as to compensate for the increase in the extent of the surface which is exposed to the slit 42 in a certain space of time. When an increase in the flow of amalgam to the distributer 37 is needed, therefore, it will be automatically provided for by the governor 70.

From the foregoing description it is thought that the operation of my improved apparatus will be readily understood. Briefly stated, however, it is as follows: The plate or sheet of glass to be silvered is placed upon the belt or carrier 19 at the feed end of the machine, and the driving-gear 32 is rotated by grasping the crank or handle 33 thereof and turning the same to the left. As this gear 32 meshes with the gears 30 and 31 on the rollers 22 and 29, respectively, both of the belts or carriers 19 and 20 will be moved in the same direction from the feed end of the machine toward the discharge end thereof. This feeding of the plate of glass will, through the governor 70, heretofore described, cause the elevation of the needle or plunger 56 to a certain extent, commensurate with the speed of the feeding movement. The tube or cut-off 55, however, will remain in its lowermost position in contact with the flange 58, constituting the seat of the valve 54, preventing the flow of amalgam from the hopper 34 to the distributing-pipe 36. As soon as the front edge of the plate of glass comes in contact with the roller 63 on the arm 62 of the lever 60 said lever 60 is rocked in its bearings and through the means described raises the cut-off 55 and permits the amalgam to flow from the hopper 34 into the distributer 37. Passing the roller 63, the plate of glass moves beneath the pressure-roller 49, by means of which it is forced and held down into yielding contact with the upper edge of the distributer 37, in which the slit 42 is formed. When the glass comes opposite said slit 42, therefore, it is met with a stream or jet of amalgam in a molten condition. As soon as it strikes the cold surface of the glass, however, it hardens or congeals and adheres thereto. As the slit 42 is of the same width as the glass being silvered, the amalgam is applied evenly to all parts of the surface of the glass, and when said glass passes beyond the distributer it is conveyed to the discharge end of the machine by means of the belt or carrier 20. As soon as the rear end thereof passes the roller 63 upward pressure upon said roller and upon the lever 60, to which it is connected, is relieved, and the cut-off 55 returns to its normal position and checks the flow of material from the hopper 34 to the distributer 37. There is no waste or overflow of amalgam, therefore, after the plate of glass passes beyond the slit 42 in the distributer. The belt or carrier 20 is provided for the purpose of preventing the scratching or abrading of the somewhat-soft amalgam on the under surface of the plate of glass after it has been coated. Were this belt or carrier 20 not provided, the danger of abrading or defacing the surface of the glass would be very great, and extreme care would have to be used to avoid destroying the mirror. If the crank or handle 33 is turned regularly and not above a certain predetermined rate of speed, the governor 70 and the needle or plunger 56 remain in the same positions. If, however, the crank or handle 33 be turned rapidly, the governor 70 is operated to open the regulating-needle 56 wider, the extent of the opening movement of said needle being commensurate with the increase in the speed at which the glass is passed through the machine.

By turning the shaft 10 the table 1 may be raised at the discharge end of the machine, so that it will be slightly inclined toward the feed end. The purpose of this tilting of the table is to provide for the flow of any of the liquid amalgam which may adhere to the under surface of the glass toward that portion of the glass which has not received any amalgam. In this way provision is made for preventing an uneven coating of the glass, which renders the complete mirror defective.

When narrower glass is to be silvered than that for which the apparatus is particularly designed for use, means must be provided for closing up that end of the slit 42 in the distributer which remains uncovered by the glass which passes over the same. The means provided by me for this purpose consists of a sliding cap or cover 81, having a handle 82 thereon and provided with side flanges 83. The said cap is adapted to fit upon the upper discharge end of the distributer 37 and to be adjusted back and forth thereon to close the end of the slit 42 to a greater or less extent. The flanges 83 embrace and have a close but sliding contact with the side walls of said distributer, enabling said cap to prevent the escape or leakage of amalgam from that portion of the slit 42 which remains uncovered by the narrow sheet or plate of glass operated upon.

Having now described my invention, what I claim as new, and desire to secure by Letters Patent, is—

1. In a glass-silvering apparatus, the combination with a distributer, and a hopper for containing the amalgam or silvering material communicating with said distributer, of feeding means for the plate of glass, means in position to be actuated by the plate of glass for starting the flow of the silvering material from the hopper to the distributer when the plate of glass approaches the distributer and for cutting off the flow of silvering material from said hopper to said distributer when the plate of glass moves away from said distributer, and means controlled by said feeding means for regulating the extent of flow of said silvering material, as and for the purpose set forth.

2. In a glass-silvering apparatus, the combination with a distributer, and a hopper for containing the amalgam or silvering material communicating with said distributer, of feeding means for the plate of glass, means in position to be actuated by the plate of glass for starting the flow of the silvering material from the hopper to the distributer when the plate of glass approaches said distributer and for cutting off the flow of silvering material from the hopper to the distributer when the plate of glass moves out of contact therewith, and a governor connected with said feeding means and operated thereby for controlling the extent of flow of said silvering material, as and for the purpose set forth.

3. In a glass-silvering apparatus, the combination with a distributer, a hopper for containing the amalgam or silvering material communicating with said distributer, and a valve for controlling the flow of material from said hopper to said distributer, of feeding means for the plate of glass, means in position to be actuated by the plate of glass for opening said valve when the plate of glass approaches said distributer and for closing said valve when the plate of glass moves out of contact therewith, and means connected with and operated from said feeding means for controlling the extent of flow of said silvering material, as and for the purpose set forth.

4. In a glass-silvering apparatus, the combination with a distributer, a hopper for containing the amalgam or silvering material communicating with said distributer, and a normally closed valve for controlling the flow of material from said hopper to said distributer, of feeding means for the plate of glass, a lever connected with said valve in position to be engaged by the plate of glass when the same approaches said distributer for opening said valve, and means connected with and operated by said feeding means for controlling the extent of flow of said silvering material, as and for the purpose set forth.

5. In a glass-silvering apparatus, the combination with a distributer, a hopper for containing the amalgam or silvering material communicating with said distributer, and a normally closed valve for controlling the flow of material from said hopper to said distributer, of feeding means for the plate of glass, a lever connected with said valve having a laterally-projecting arm thereon lying within the path of movement of the plate of glass to be silvered, the said arm being adapted to be engaged by said plate of glass as the same approaches said distributer for rocking said lever and opening said valve, and means connected with and operated from said feeding means for controlling the extent of flow of the silvering material, as and for the purpose set forth.

6. In a glass-silvering apparatus, the combination with a distributer, and a hopper for containing the amalgam or silvering material communicating with said distributer, of a duplex valve interposed between said hopper and said distributer, comprising a cut-off and a plunger for regulating the extent of opening of the valve, feeding means for the plate of glass, means in position to be actuated by the plate of glass for opening said cut-off when the plate of glass approaches said distributer and for closing said cut-off when the plate of glass moves out of contact therewith, and means connected with and operated from said feeding means for opening and closing said plunger, as and for the purpose set forth.

7. In a glass-silvering apparatus, the combination with a distributer, and a hopper for containing the amalgam or silvering material communicating with said distributer, of a duplex valve interposed between said hopper and said distributer, comprising a tubular cut-off and a plunger movable within said cut-off for regulating the extent of opening of the valve, feeding means for the plate of glass, means in position to be actuated by the plate of glass for opening said cut-off when the plate of glass approaches said distributer and for closing said cut-off when the plate of glass moves out of contact therewith, and a governor connected with and operated from said feeding means for opening and closing said plunger, as and for the purpose set forth.

8. In an apparatus for silvering glass, the combination with a distributer and a hopper for containing the amalgam or silvering material communicating with said distributer, of a normally closed vertically-movable valve controlling the flow of material from the hopper to the distributer whose stem extends in line with said valve, a lever fulcrumed upon said hopper and engaging the stem of said valve, for opening it, and a second lever connected with the first lever and having a laterally-extending arm thereon, the said arm lying in position to be engaged by the plate of glass as it approaches said distributer, for opening said valve, as and for the purpose set forth.

9. In an apparatus for silvering glass, the combination with a distributer, a hopper for containing the amalgam or silvering material communicating with said distributer and feeding means for the plate of glass to be silvered, of a valve for controlling the flow of silvering material from the hopper to the distributer, and a governor connected with said feeding means for regulating the extent of opening of said valve according to the speed of movement of said feeding means.

10. In an apparatus for silvering glass, the combination with a distributer, a hopper for containing the amalgam or silvering material communicating with said distributer and feeding means for the plate of glass to be silvered, of a valve for controlling the flow of silvering material from the hopper to the distributer, and a governor comprising a rotary shaft connected with said feeding means and rotated thereby, a sleeve loosely mounted on said shaft, a lever fulcrumed to said hopper and connected at its opposite ends to said sleeve and to the stem of said valve, and governor-arms adapted to be thrown outwardly by centrifugal force during the rotation of said shaft, the said arms being connected with said sleeve and adapted to move the same longitudinally.

11. In an apparatus for silvering glass, the combination with a distributer, a hopper for containing the amalgam or silvering material communicating with said distributer, and feeding means for the plate of glass to be silvered, the said feeding means including a drum or roller having a gear or pinion thereon, of a valve for controlling the flow of the silvering material from the hopper to the distributer, and a governor for regulating the extent of opening of said valve according to the speed of movement of said feeding means, the same comprising a rotary shaft having a gear or pinion thereon meshing with the gear or pinion on said drum or roller, a sleeve loosely mounted on said shaft and having an annular groove therein, a lever fulcrumed to said hopper and connected at its opposite ends to said sleeve and to the stem of said valve, arms secured to said shaft and extending outwardly therefrom, and weighted governor-arms pivoted therein and having inwardly-extending flanges or projections lying within said groove, as and for the purpose set forth.

12. In an apparatus for silvering glass, the combination with a table having side flanges thereon, of a distributer having arms thereon pivoted to said flanges, means for supplying silvering material to said distributer, and means for supporting and adjusting the position of said distributer, consisting of a rotary shaft having cam-surfaces thereon engaging the under side of said distributer, and a handle for turning said shaft.

13. In an apparatus for silvering glass, the combination with a distributer having a discharge slit or opening therein, and means for feeding a plate of glass over said distributer, of means adjustable longitudinally of said distributer for closing one end of said slit, as and for the purpose set forth.

14. In an apparatus for silvering glass, the combination with a distributer having an elongated discharge slit or opening therein, and means for feeding a plate of glass over said distributer, of a cut-off slide adjustable longitudinally of said distributer for closing one end of said slit or opening, as and for the purpose set forth.

15. In an apparatus for silvering glass, the combination with a distributer having an elongated discharge slit or opening therein, and means for feeding a plate of glass over said distributer, of a cap having side flanges thereon embracing the sides of said distributer and adjustable longitudinally thereof for closing one end of said slit or opening, as and for the purpose set forth.

In testimony whereof I have hereunto set my hand in presence of two subscribing witnesses.

CONSTANT LAVAL.

Witnesses:
I. V. HOUG,
RACHEL M. LENNOX.